United States Patent
Yamamoto et al.

(10) Patent No.: US 7,715,558 B2
(45) Date of Patent: May 11, 2010

(54) ENCRYPTED-CONTENT RECORDING MEDIUM, PLAYBACK APPARATUS, AND PLAYBACK METHOD

(75) Inventors: Masaya Yamamoto, Hirakata (JP); Toshihisa Nakano, Neyagasa (JP); Ohmori Motoji, Hirakata (JP); Masayuki Kozuka, Arcadia, CA (US)

(73) Assignee: Panasonic Corporation, Osaka (JP)

( * ) Notice: Subject to any disclaimer, the term of this patent is extended or adjusted under 35 U.S.C. 154(b) by 1093 days.

(21) Appl. No.: 10/796,972

(22) Filed: Mar. 11, 2004

(65) Prior Publication Data

US 2005/0203853 A1    Sep. 15, 2005

(51) Int. Cl.
*H04N 7/167* (2006.01)

(52) U.S. Cl. .................... 380/201; 726/26; 713/193
(58) Field of Classification Search ................ 380/201, 380/231–234, 277, 281, 286, 44, 45, 279; 713/193, 155; 726/26–33
See application file for complete search history.

(56) References Cited

U.S. PATENT DOCUMENTS

| | | | |
|---|---|---|---|
| 6,772,340 B1 * | 8/2004 | Peinado et al. | 713/168 |
| 7,073,073 B1 * | 7/2006 | Nonaka et al. | 713/193 |
| 7,191,154 B2 * | 3/2007 | Oshima et al. | 705/57 |
| 2002/0016919 A1 * | 2/2002 | Sims, III | 713/193 |
| 2002/0114458 A1 * | 8/2002 | Belenko et al. | 380/201 |
| 2003/0084281 A1 | 5/2003 | Abiko et al. | |
| 2004/0039907 A1 | 2/2004 | Sako et al. | |

FOREIGN PATENT DOCUMENTS

JP    2003-37589    2/2003
JP    2003-131949   5/2003

* cited by examiner

*Primary Examiner*—Gilberto Barron, Jr.
*Assistant Examiner*—Simon Kanaan
(74) *Attorney, Agent, or Firm*—Wenderoth, Lind & Ponack, L.L.P.

(57) ABSTRACT

An encrypted content playback apparatus and a playback method are suitable for content playback from a recording medium having stored thereon both content that is subject to conventional copy protection and content to which DRAM is applied. The recording medium stores information indicating, for each content, whether the content is content subject to conventional copy protection or content to which DRAM is applied. Based on this information, the playback apparatus determines the key to use to decrypt the content.

16 Claims, 15 Drawing Sheets

FIG.4

| PLAYBACK NUMBER | PLAYBACK CONTENT | NEXT PLAYBACK NUMBER | PLAYBACK NUMBER WHEN UNPLAYABLE |
|---|---|---|---|
| 1 | Opening.mpg | 2 | — |
| 2 | Trailer.mpg | 3 | 4 |
| 3 | Movie.mpg | 5 | — |
| 4 | Warning.mpg | 5 | — |
| 5 | Menu.mpg | — | — |
| 6 | Making.mpg | 5 | — |
| 7 | Interview.mpg | 5 | — |
| 8 | Trailer.mpg | 5 | — |

FIG.5

| BUTTON NUMBER | PLAYBACK NUMBER ON DETERMINATION | UPWARD MOVEMENT | DOWNWARD MOVEMENT | LEFTWARD MOVEMENT | RIGHTWARD MOVEMENT |
|---|---|---|---|---|---|
| 1 | 3 | 3 | 2 | 3 | 2 |
| 2 | 6 | 1 | 3 | 1 | 3 |
| 3 | 7 | 2 | 4 | 2 | 4 |
| 4 | 8 | 4 | 1 | 4 | 1 |

FIG.6

| PLAYBACK CONTENT | CONTENT UNIQUE INFORMATION | KEY GENERATION INFORMATION | PLAYABILITY INFORMATION | COPYABILITY INFORMATION | CORRESPONDING RIGHTS METHOD INFORMATION |
|---|---|---|---|---|---|
| Opening.mpg | 1111 | MEDIUM KEY | PLAYABLE | Once | — |
| Trailer.mpg | 2222 | MEDIUM KEY | PLAYABLE | Free | — |
| Movie.mpg | 3333 | COMPOSITE KEY | NOT PLAYABLE | Never | METHOD A |
| Warning.mpg | 4444 | MEDIUM KEY | PLAYABLE | Never | — |
| Menu.mpg | 5555 | MEDIUM KEY | PLAYABLE | Never | — |
| Making.mpg | 6666 | RIGHTS KEY | NOT PLAYABLE | Never | METHOD A, METHOD B |
| Interview.mpg | 7777 | RIGHTS KEY | NOT PLAYABLE | Never | METHOD B |

FIG.7

| DEVICE UNIQUE INFORMATION | ENCRYPTED MEDIUM KEY |
|---|---|
| 0001 | qwerty |
| 0002 | asdfgh |
| 0004 | zxcvbn |
| 0005 | uiop@[ |
| 0006 | jkl;:] |
| 0007 | m,./¥¥ |
| .. | .. |

FIG.12

| RIGHTS METHOD INFORMATION | CORRESPONDING PLAYBACK CONTENT | RIGHTS KEY | PLAYBACK COUNT | PLAYBACK EXPIRATION |
|---|---|---|---|---|
| A | Movie.mpg | qwerty | 2 | — |
| A | Making.mpg | asdfgh | 3 | — |
| B | Making.mpg | asdfgh | — | 31/03/2004 |
| .. | .. | .. | .. | .. |

ENCRYPTED-CONTENT RECORDING MEDIUM, PLAYBACK APPARATUS, AND PLAYBACK METHOD

BACKGROUND OF THE INVENTION (1) Field of the Invention

The present invention relates to a playback apparatus and a playback method for rights protected content, and a recording medium on which data used in the playback apparatus and playback method is recorded.

(2) Prior Art

CSS (Content Scrambling System) has been introduced into DVDs (Digital Versatile Discs) in order to prevent illegal copying of content. In CSS, information unique to the DVD medium is recorded on the DVD medium, and a title key is generated from the unique information and information held by a playback apparatus. The title key generated in this way is used to decrypt, and then playback, the encrypted content recorded on the DVD medium (see Japanese Laid-Open Patent Application No. 2003-37589).

Meanwhile, content distribution systems that use DRM (digital rights management) are starting to become common in recent years. In DRM, a license is distributed separately to the encrypted content. The license includes a license key and usage conditions, and the playback apparatus decrypts and plays back the content with the license key, in accordance with the usage conditions.

In DRM, the content and license are distributed via a network. Furthermore, tests are being performed recently for distributing content in a storage-type broadcast system called server-type broadcasting.

BDs (Blu-ray Discs) are a type of medium that has been proposed for use instead of DVDs. A BD has approximately five times the capacity of a DVD, and is capable of storing not only SD picture quality video as has been possible up to now, but also HD picture quality video.

Similar to CSS in conventional DVDs, BDs use a system in which information unique to the medium is recorded on the BD, and a medium key is generated from this information and information held by the playback device. The medium key obtained in this way is used to encrypt the content, and the encrypted content is recorded on the medium. This kind of method prevents illegal copying of the content in the same manner as with DVDs.

Furthermore, ways of applying DRM to BDs are being investigated. When DRM is applied to packaged media, content that has been encrypted with a license key is stored on the medium, and the license is distributed separately over a network. At the time of playback, the encrypted content recorded on the medium is decrypted with the license key and played back.

However, when applying DRM to BDs, a problem arises when both content that is copy protected in a conventional manner and content to which DRM is applied exist on the medium. In such a case, the player is unable to distinguish between content that is copy protect in a conventional manner and content to which DRM is applied. If the player attempts to use the medium key to decrypt content to which DRM is applied, the player will be unable to decrypt the content. Conversely, if the player attempts to search for the license that corresponds to the content that is copy protected in a conventional manner, the player will not be able to play the content back because no corresponding license exists.

SUMMARY OF THE INVENTION

For these reasons, the object of the present invention is to provide a data structure that is suitable for appropriately playing back content that is copy protected in a conventional manner and content to which DRM is applied when both types of content exist on a medium. Furthermore, the object is to provide a recording medium that stores data having such a structure, and a playback apparatus and a playback method for playing back the data.

In order solve the stated problem, the present invention is a playback terminal for playing back a medium on which is recoded encrypted content and a medium key that is unique to the medium, including: a license obtaining unit operable to obtain a license that includes at least a decryption key for the encrypted content; a content key obtaining unit operable to obtain a content key from the license; a key selection unit operable to judge which of the medium key and the content key is to be used in decryption of the encrypted content; and a decryption unit operable to decrypt the encrypted content using the key selected by the key selection unit.

Furthermore, the present invention is a playback terminal for playing back a medium on which is recoded encrypted content, a medium key that is unique to the medium, and key selection information, including: a license obtaining unit operable to obtain a license that includes at least a decryption key for the encrypted content; a content key obtaining unit operable to obtain a content key from the license; a key selection unit operable to judge, based on the key selection information, which of the medium key and the content key is to be used in decryption of the encrypted content; and a decryption unit operable to decrypt the encrypted content using the key selected by the key selection unit.

Furthermore, the present invention is a playback terminal for playing back a medium on which is recoded encrypted content, a medium key that is unique to the medium, and key selection information, including: a license obtaining unit operable to obtain a license that includes at least a decryption key for the encrypted content and a usage condition; a content key obtaining unit operable to obtain a content key from the license; a key selection unit operable to judge, based on the key selection information, which of the medium key and the content key is to be used in decryption of the encrypted content; a usability judgment unit operable to judge, based on the usage condition, whether content corresponding to the license is usable; and a decryption unit operable to decrypt the encrypted content using the key selected by the key selection unit, when either (i) the key selection unit judges that the medium key is to be used, or (ii) when the key selection unit judges that the license key is to be used and the usability judgment unit judges that the content is usable.

Furthermore, the present invention is a playback method for playing back a medium on which is recoded encrypted content and a medium key that is unique to the medium, including: a license obtaining step of obtaining a license that includes at least a decryption key for the encrypted content; a content key obtaining step of obtaining a content key from the license; a key selection step of judging which of the medium key and the content key is to be used in decryption of the encrypted content; and a decryption step of decrypting the encrypted content using the key selected in the key selection step.

Furthermore, the present invention is a playback method for playing back a medium on which is recoded encrypted content, a medium key that is unique to the medium, and key selection information, including: a license obtaining step of obtaining a license that includes at least a decryption key for the encrypted content; a content key obtaining step of obtaining a content key from the license; a key selection step of judging, based on the key selection information, which of the medium key and the content key is to be used in decryption of the encrypted content; and a decryption step of decrypting the encrypted content using the key selected in the key selection step.

Furthermore, the present invention is a playback method for playing back a medium on which is recoded encrypted content, a medium key that is unique to the medium, and key selection information, including: a license obtaining step of obtaining a license that includes at least a decryption key for the encrypted content and a usage condition; a content key obtaining step of obtaining a content key from the license; a key selection step of judging, based on the key selection information, which of the medium key and the content key is to be used in decryption of the encrypted content; a usability judgment step of judging, based on the usage condition, whether content corresponding to the license is usable; and a decryption step of decrypting the encrypted content using the key selected in the key selection step, when either (i) in the key selection step it is judged that the medium key is to be used, or (ii) when in the key selection step it is judged that the license key is to be used and in the usability judgment step it is judged that the content is usable.

Furthermore, the present invention is a medium that stores encrypted content, the medium having recorded thereon: a medium key that is unique to the medium; and key selection information indicating whether or not the encrypted content is encrypted with the medium key.

BRIEF DESCRIPTION OF THE DRAWINGS

FIG. 4 shows an example of the data structure of playback control information;

FIG. 5 shows an example of the data structure of button display data;

FIG. 6 shows an example of the data structure of key control information;

FIG. 7 shows an example of the data structure of medium unique information;

FIG. 12 shows an example of the data structure of rights information;

DESCRIPTION OF THE PREFERRED EMBODIMENT

The following describes the present invention with reference to the drawings.

(Overall Structure of the Content Playback System)

Figure 1:
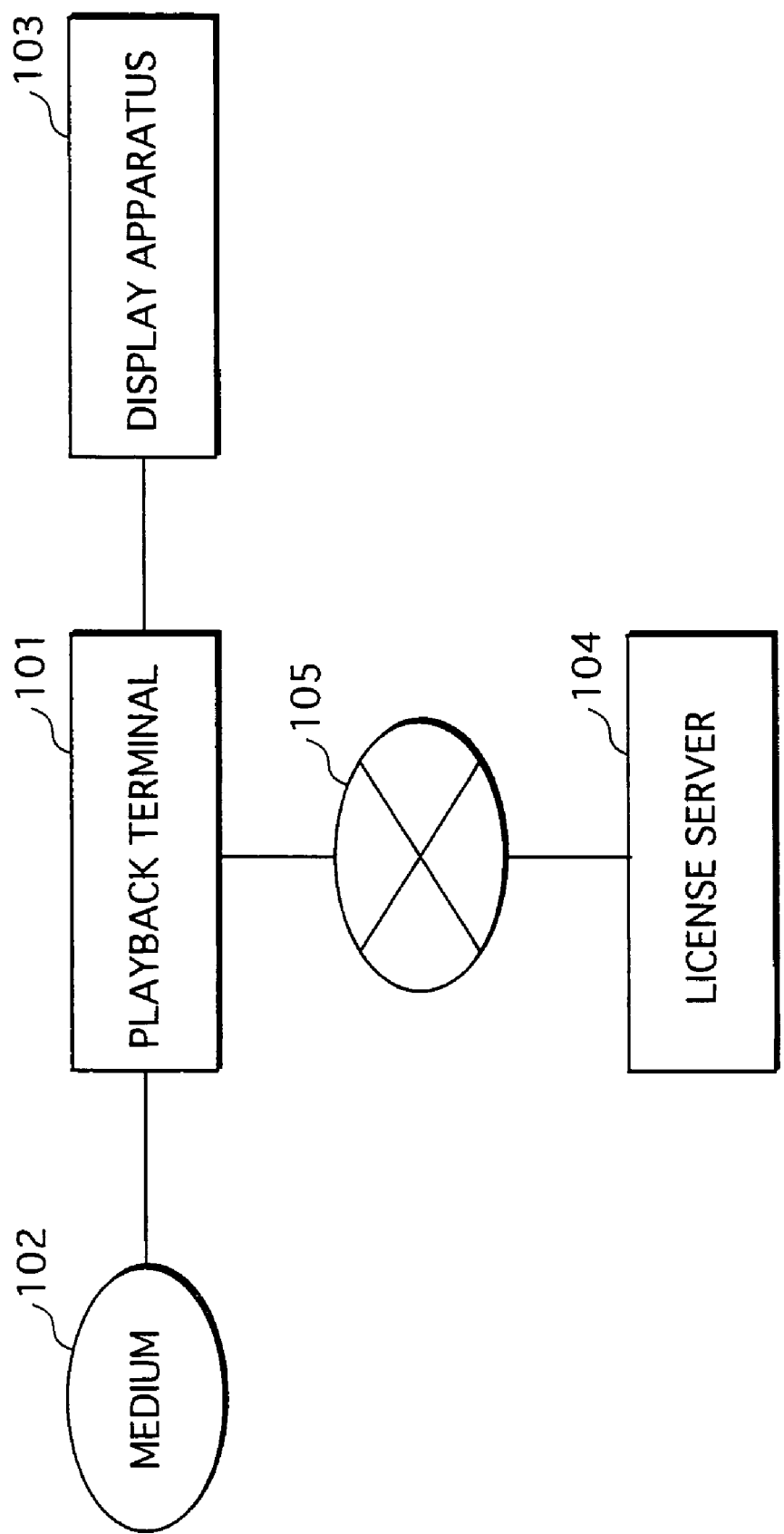
FIG. 1 shows the overall structure of the contents playback system of the first embodiment of the present invention.

FIG. 1 shows the overall structure of a content playback system of one embodiment of the present invention. In FIG. 1, the content playback system is composed of a playback terminal 101, a medium 102, a display apparatus 103, and a license server 104. The medium 102 is, for example, a BD disc, and the display terminal 103 is, for example, a television monitor. Furthermore, the playback terminal 101 and the license server 104 are connected over a network 105 such as the Internet.

Figure 2:
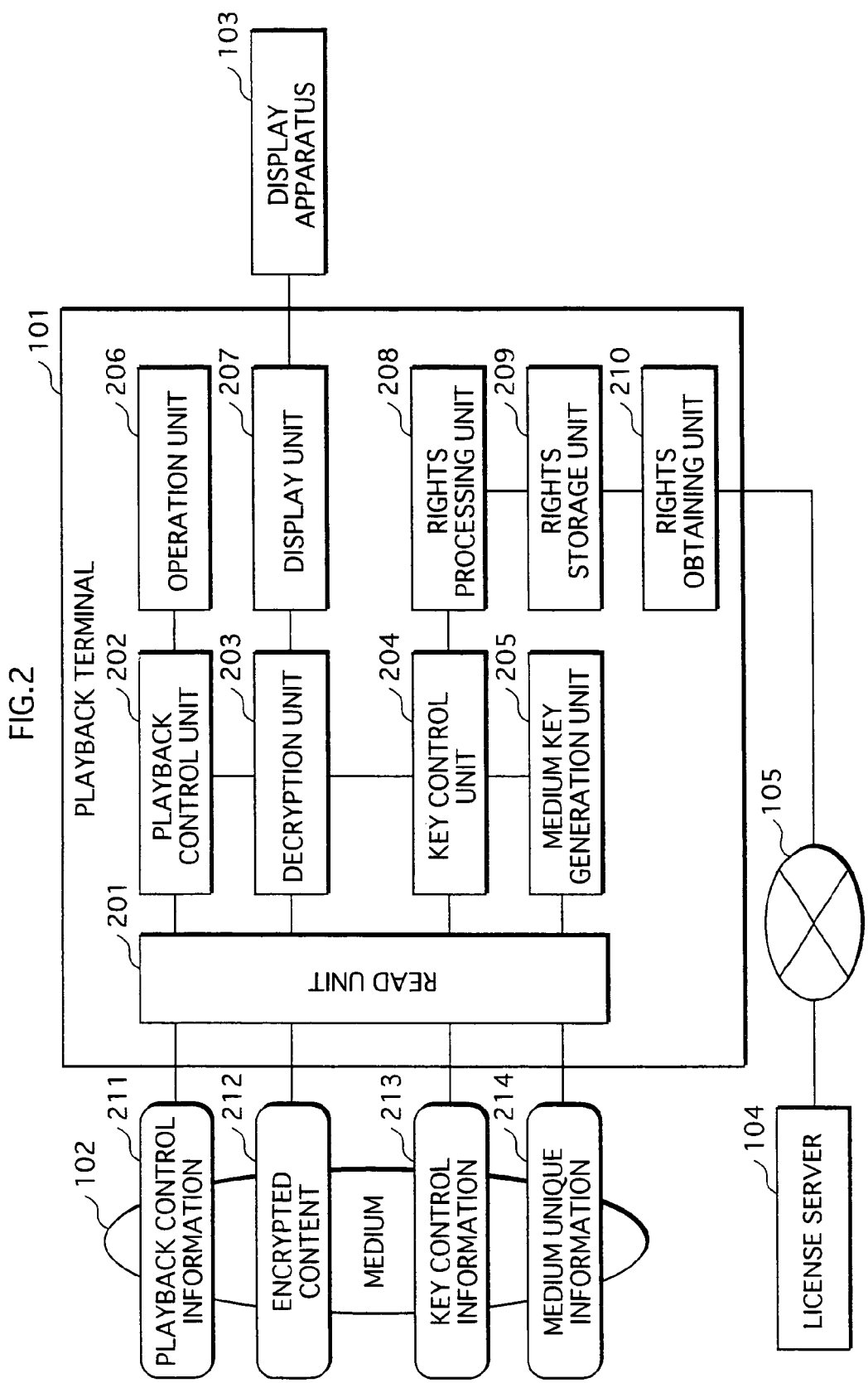
FIG. 2 shows the internal structure of a playback terminal 101, and information recorded on a medium 102.

FIG. 2 shows the internal structure of the playback terminal 101 and information recorded on the medium 102. The playback terminal 101 is composed of a read unit 201, a playback control unit 202, a decryption unit 203, a key control unit 204, a medium key generation unit 205, an operation unit 206, a display unit 207, a rights processing unit 208, a rights storage unit 209, and a rights obtaining unit 210. As one specific example, the playback terminal 101 may be a client computer system composed of a CPU, a work memory, a flash memory, a BD drive, a remote control, a video adapter, and a network adapter. In such a case, one possible method is a structure in which the read unit 201 is the BD drive, the operation unit 206 is the remote control, the display unit 207 is the video adapter, the rights storage unit 209 is the flash memory, the rights obtaining unit 210 is the network adapter, and the playback control unit 202, the decryption unit 203, the key control unit 204, the medium key generation unit 205, and the rights processing unit 208 are software that operate using the CPU and the work memory. Note that the playback terminal 101 is not limited to this specific structural example.

As shown in FIG. 2, recorded on the medium 102 are playback control information 211, encrypted content 212, key control information 213, and medium unique information 214. Since BD media use a file system such as UDF, each of the types of information shown in FIG. 2 is commonly recorded as one or a plurality of files in a file system, but is not limited to being so. Other examples of methods include recording the medium unique information in a special area in the lead in area of the BD media, recording the medium unique information using a BCA (Burst Cutting Area), or recording information with an intentionally created error with respect to an error detection code.

Figure 3:
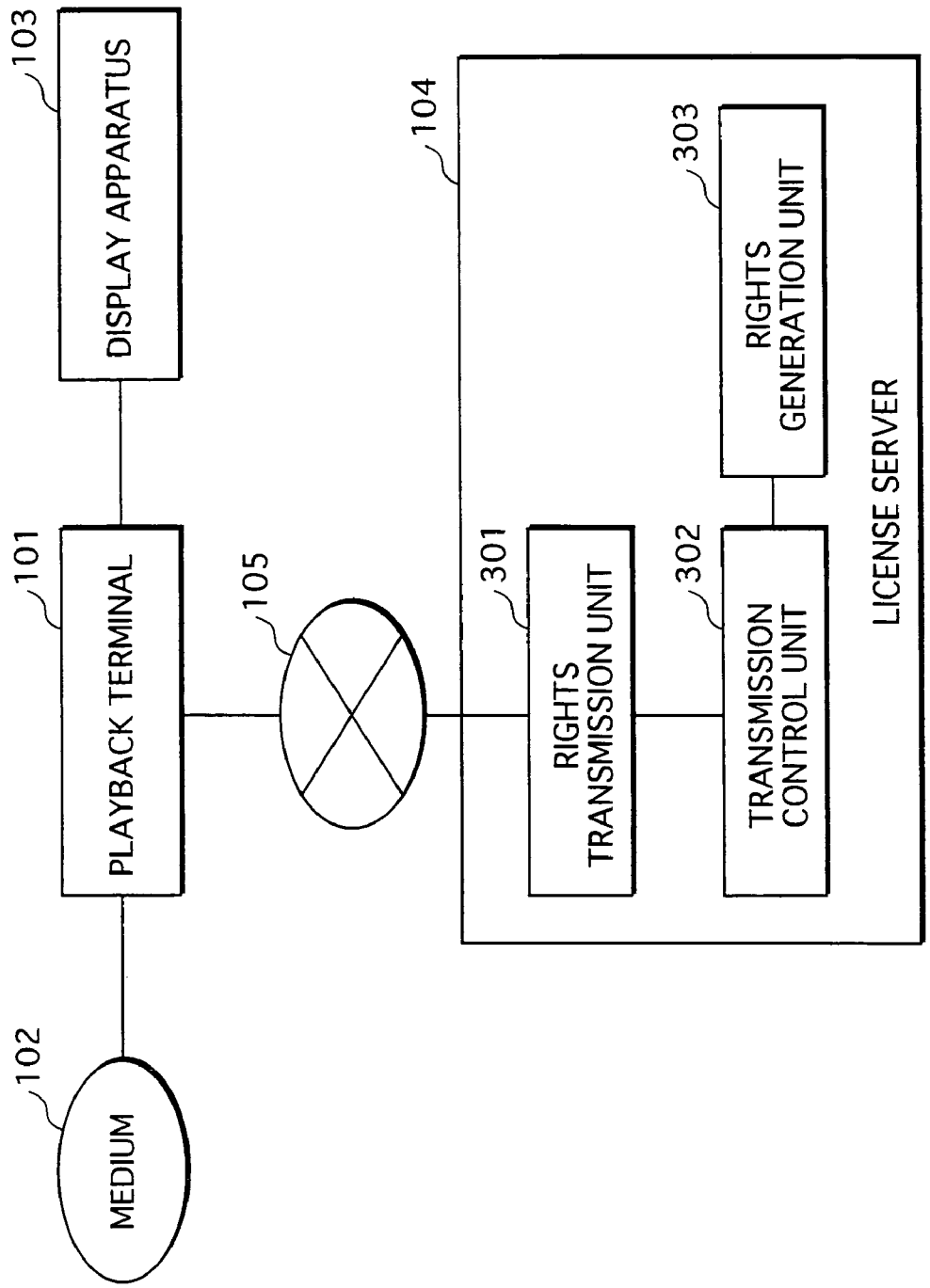
FIG. 3 shows the internal structure of a license server 104.

FIG. 3 shows the internal structure of the license server 104. The license server 104 is composed of a rights transmission unit 301, a transmission control unit 302, and a rights generation unit 303. As one specific example, the license server 104 may be a server computer system composed of a CPU, a work memory, an HDD, and a network adapter. In this case, one possible method is a structure in which the rights transmission unit 301 is the network adapter, and the transmission control unit 302 and the rights generation unit 303 are software that operates using the CPU and the work memory. Note that the license server 104 is not limited to this specific structural example.

This completes the description of the overall structure of the playback system. The following describes the data structure of the information stored on the medium 102, with use of FIG. 4 to FIG. 7.

(Data Structure of Playback Control Information)

FIG. 4 shows an example of the data structure of the playback control information. Each item of playback control information is composed of four types of information.

"Playback Number"

The playback number is an index number that arbitrarily identifies the item of playback control information. The playback numbers start at "1", and increase by one with each item.

"Playback Content"

The playback content is information that identifies the content corresponding to the item. Each content is stored on the BD media as one file, and a file name of the content corresponding to the playback content is recorded in the playback content.

"Next Playback Number"

The next playback number indicates a number of an item to be played back next after playback of the particular content is complete. For example, since the next playback number in the first item is "2", after completion of playback of "Opening.mpg", playback of "Trailer.mpg" commences.

"Playback Number when Unplayable"

The playback number when unplayable indicates the number of an item that is to be played back instead of the content indicated by the next playback number when the content indicated by the next playback number cannot be played back. For example, since the next playback number of the second item is "3" and the playback number when unplayable of the second item is "4", after playback of "Trailer.mpg" is complete, "Warning.mpg" is played back if "Movie.mpg" is unable to be played back. Note that when a playback number when unplayable is not designated, the content indicated by the next playback number is forcedly played back regardless of whether or not the content is playable.

(Data Structure of Encrypted Content)

The encrypted content is data generated by encrypting a transport stream that is an MPEG 2 video elementary stream and an MPEG 2 audio elementary stream that have been multiplexed using a method stipulated by MPEG 2. The encryption is performed using AES (Advanced Encryption Standard) and by encrypting the payload of each packet of a transport stream, excluding the adaptation field.

Furthermore, in the case of content for a menu, button display data may be stored in addition to the video elementary stream and the audio elementary stream. Button display data is commonly recorded as a private stream, but is not limited to being so. FIG. 5 shows one example of the structure of button display data. Each item of button display data is composed of six pieces of information.

"Button Number"

The button number is an index number that arbitrarily identifies an item of the button display information. The button numbers start at "1" and increase by one with each item. Note that when playback of the content for the menu commences, the button registered in the first item is in a selectable state.

"Playback Number on Determination"

The playback number on determination identifies content of which playback is to commence when a button has been determined according to an instruction with the remote control. The number here corresponds to a playback number in an item of playback control information. For example, since the playback number on determination "3" is designated in the first item, Movie.mpg, which is designated by the playback number "3" in the playback control information", is played back.

"Upward Movement"

"Upward movement" is information identifying the number of a button to be newly put into a selectable state when an upward movement is instructed with the remote control while a button of the particular item is selected. For example, since "3" is designated in the first item, the button designated by the third item is put into a selectable state.

"Downward Movement"

"Downward movement" is information identifying the number of a button to be newly put into a selectable state when a downward movement is instructed with the remote control while a button of the particular item is selected.

"Leftward Movement"

"Leftward movement" is information identifying the number of a button to be newly put into a selectable state when a leftward movement is instructed with the remote control while a button of the particular item is selected.

"Rightward Movement"

"Rightward movement" is information identifying the number of a button to be newly put into a selectable state when a rightward movement is instructed with the remote control while a button of the particular item is selected.

(Data Structure of Key Control Information)

FIG. 6 shows one example of the data structure of the key control information. Each item of key control information is composed of the following six pieces of information.

"Playback Content"

The playback content is information identifying content corresponding to the item. Here, the file name of the corresponding content is recorded, in the same manner as with the playback content in the playback control information. Note that unlike the playback control information, a same content does not appear a plurality of times in the key control information.

"Content Unique Information"

The content unique information is unique information determined for each content, and is for generating a key for the content.

"Key Generation Information"

The key generation information is for instructing a method for generating a key for the content. Each piece of key generation information indicates "medium key", "rights key", or "composite key".

"Playability Information"

The playability information indicates whether or not the content is able to be played back, and specifies either "playable" or "not playable". Note that the playability information is not limited to indicating "playable" or "not playable" as shown here, and may instead include, for example, playback quality.

"Copyability Information"

The copyability information indicates whether or not the content is able to be copied, and specifies either "Once", "Free", or "Never". "Once" means that a one generation copy may be made, "Free" means that the content is freely copiable, and "Never" means that the copying is not possible. Note that the copyability information is not limited to specifying Once, Never and Free, and may instead include information that, for example, designates copy quality or a medium to which the content is to be copied.

"Corresponding Rights Method Information"

The corresponding rights method information indicates a system used for the rights information corresponding to an item whose key generation information indicates either "rights key" or "composite key". For example, since a system A is indicated in the third item, the only rights processing permitted with respect to the corresponding content is that in which the rights are created using the system A.

(Data Structure of Medium Unique Information)

FIG. 7 shows one example of the data structure of medium unique information. The each item of medium unique information is composed of the following two pieces of information.

"Device Unique Information"

The device unique information is pieces of information that are each arbitrarily attributed to respective playback devices.

"Encrypted Medium Key"

The encrypted medium key is data obtained by encrypting a medium key with a device unique key.

In the present embodiment, the medium unique information includes an encrypted medium key for each device. If a specific playback device is made invalid due to hacking or the like, playback by the invalid device can be prevented by not recording the device unique information of the specific playback device and the corresponding encrypted medium key on the medium.

Note that in the present embodiment it is necessary to provide as many pieces of device unique information and encrypted medium keys as there are playback devices. However, since this method can be problematic because the amount of data of the medium unique information becomes unnecessarily large, the amount of data may be compressed according to a method such as using a binary tree.

This completes the description of the data structure of the information stored on the medium 102. The following describes, with use of FIG. 8 to FIG. 15, the processing in the playback terminal 101 when playing back from the medium 102.

(Medium Key Generation Processing)

The playback terminal 101 commences playback processing of the medium 102, beginning with medium key generation processing, when a playback start instruction is given by the user after the power of the playback terminal 101 has been turned on and the medium 102 has been inserted therein.

Figure 8:
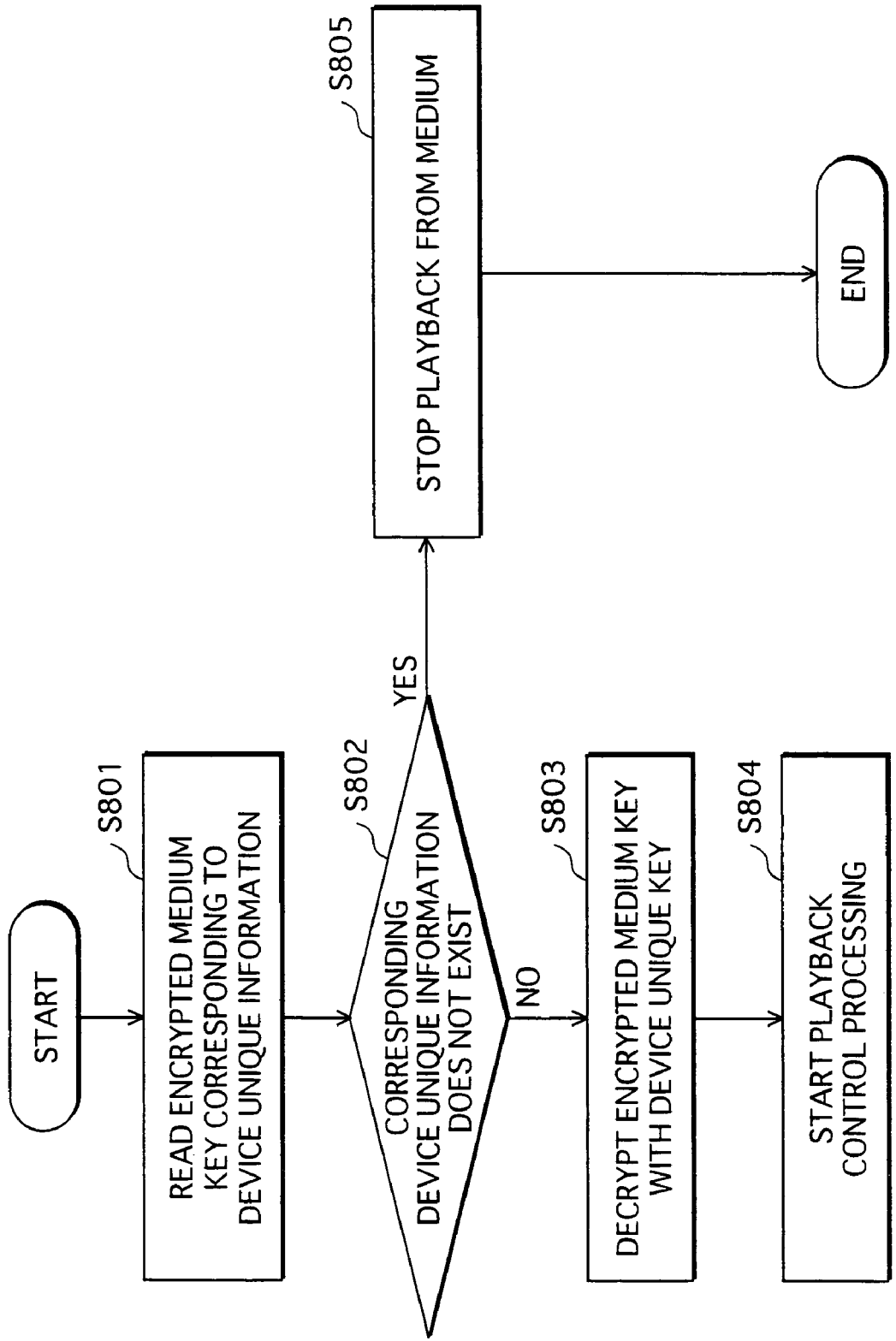
FIG. 8 is a flowchart showing procedures in medium key generation processing.

The medium key is generated in the medium key generation unit 205 from the medium unique information 214. FIG. 8 is a flowchart showing the procedures in medium key generation processing.

The medium key generation unit 205 controls the read unit 201 so as to read the medium unique information 214 from the medium 102. The medium key generation unit 205 holds device unique information for each device, and searches for device unique information that matches in the read medium unique information 214. If the medium key generation unit 205 finds a matching item of device unique information, it obtains the corresponding encrypted medium key, and moves to S803 (S801 to S802).

When matching device unique information does not exist, the playback terminal 101 stops playback from the medium and ends playback processing. For example, in the example in FIG. 7, there is no device unique information 0003 registered in the medium unique information 214. Consequently, the playback device 101 that has the device unique information 0003 stops processing without having commenced playback from the medium (S802 to S804).

The following describes a case in which a matching item exists. The medium key generation unit 205 holds a device unique key for the device, and decrypts the read encrypted medium key with the device unique key. The value obtained by decryption is used as the medium key (S803).

After notifying the key control unit 204 of the obtained medium key, the playback terminal 101 commences playback processing described next.

(Playback Control Processing)

After obtaining the medium key according to medium key generation processing, the playback terminal 101 commences playback in accordance with the playback control information 211.

Figure 9:
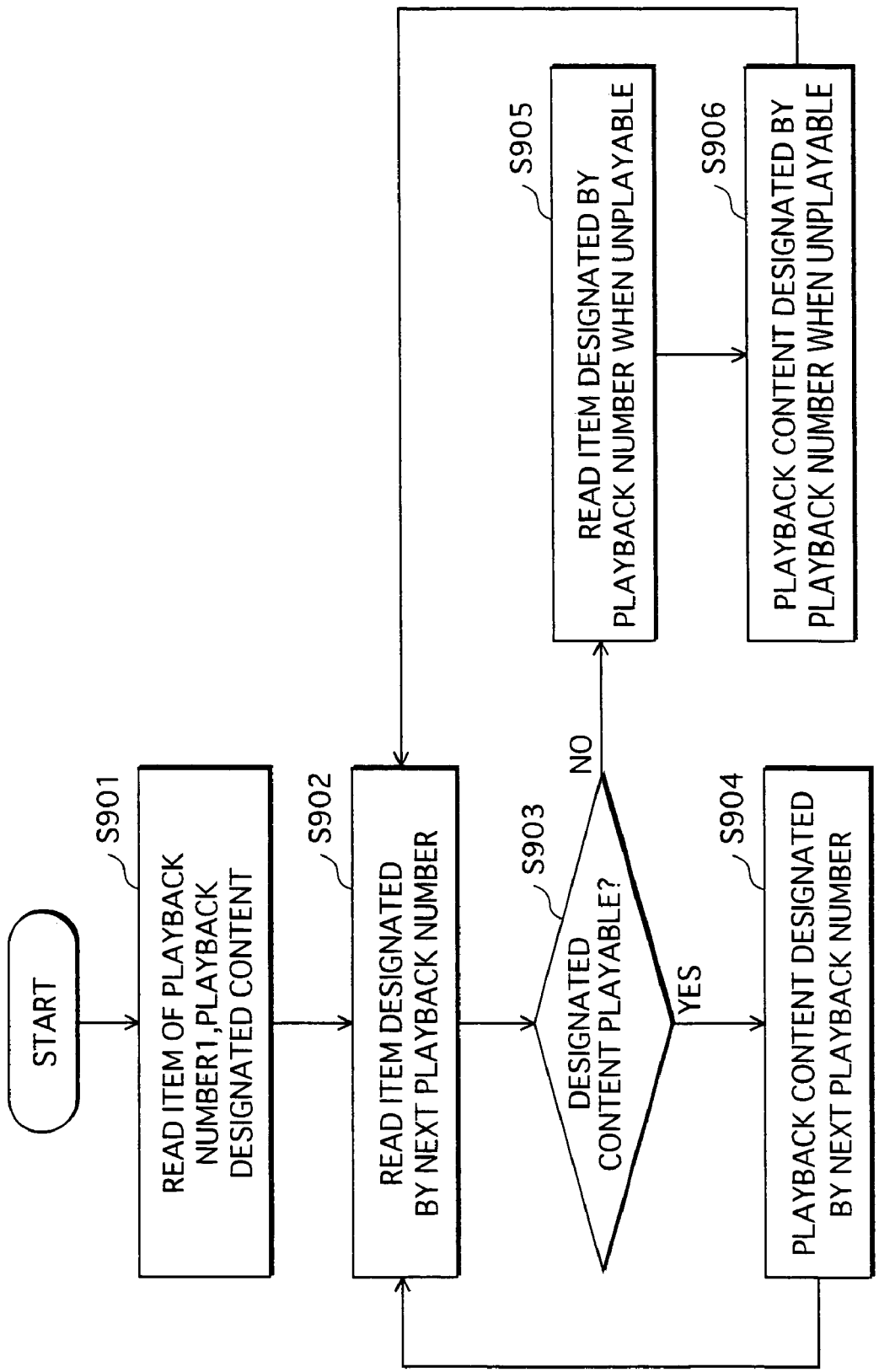
FIG. 9 is a flowchart showing procedures in playback control processing

FIG. 9 is a flowchart showing procedures in playback control processing by the playback control unit 202.

The playback control unit 202 controls the read unit 201 so as to read the playback control information 211 from the medium 102. First, the playback control unit 202 reads the item having the playback number 1 from the playback control information 211. Here, the playback control unit 202 instructs playback of the specified playback content to the decryption unit 203. Note that content playback processing by the decryption unit 203 is described later (S901).

After playback of the content designated by the playback number 1 is complete, the playback control unit 202 reads the item specified by the next playback number from the playback control information, and further obtains the specified item in the playback content (S902).

The playback control unit 202 inquires to the rights processing unit 208, via the decryption unit 203 and the key control unit 204, whether or not the obtained playback content is playable. Note that playability judgment processing by the decryption unit 203, the key control unit 204 and the rights processing unit 208 is described later (S903).

When, as a result of the inquiry to the rights processing unit 208, the playback content obtained at S902 is judged to be playable, the playback content obtained at step S902 is played back. After playback is complete, the processing transitions to S902, and content is successively played back (S904).

On the other hand, when, as a result of the inquiry to the rights processing unit 208, the playback content obtained at S902 is judged not to be playable, the playback control unit 202 reads the item specified by the "playback number when unplayable" from the playback control information 211, and plays back the playback content in the specified item. After playback is complete, the processing transitions to S902, and content is successively played back (S905 to S906).

(Content Playback Processing)

When playback of a specific content has been determined according to the playback control processing, the playback terminal 101 reads the encrypted content from the medium 102, and plays back the content.

Figure 10:
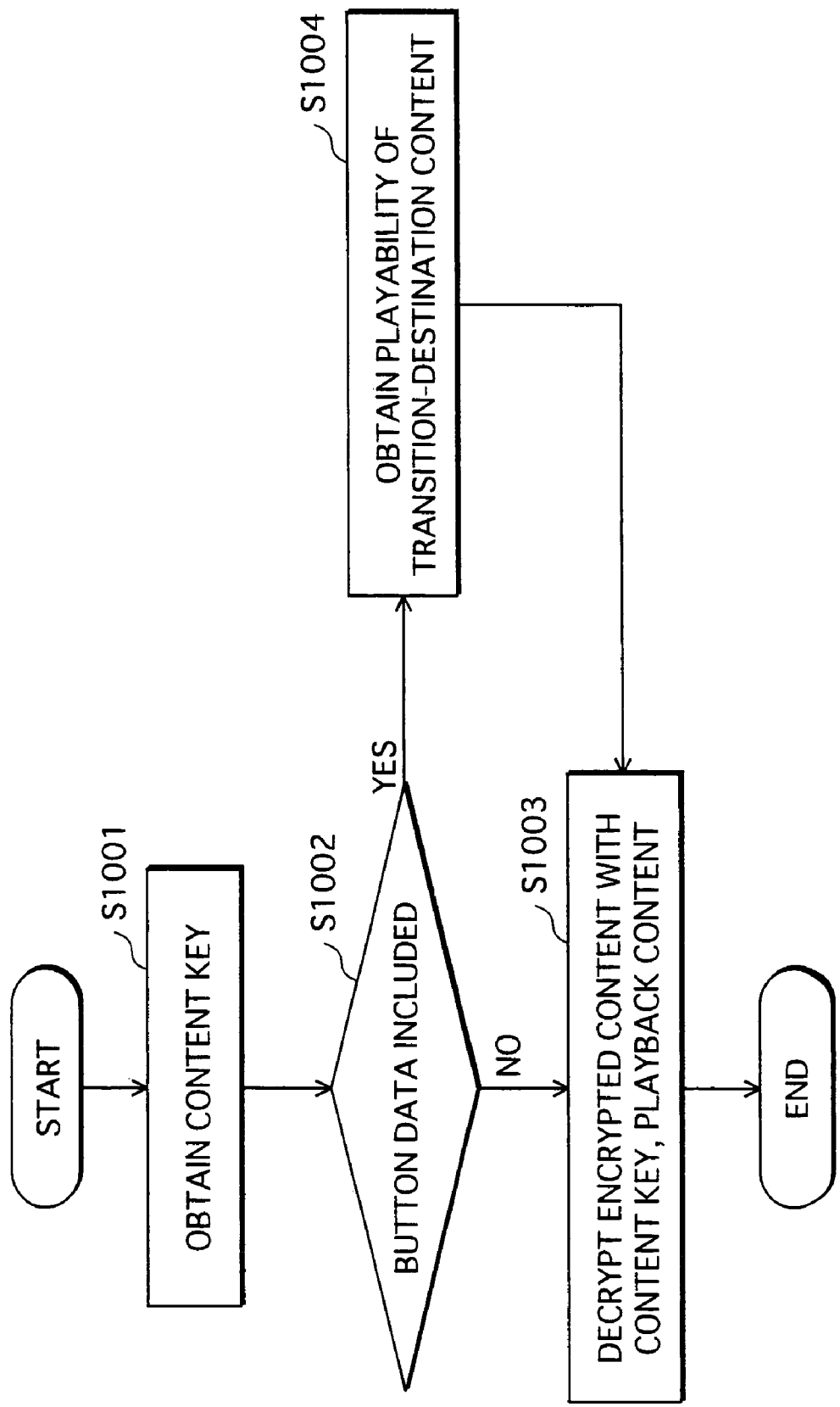
FIG. 10 is a flowchart showing procedures in content playback processing.

FIG. 10 is a flowchart showing procedures in content playback processing by the decryption unit 203 and the display unit 207.

The decryption unit 203 controls the key control unit 204 so as to obtain the content key. Note that the content key obtaining processing by the key control unit 204 is described later (S1001).

The decryption unit 203 controls the read unit 201 so as to read the encrypted content from the medium. The encrypted content read here is the encrypted content specified by a file name instructed by the playback control unit in the aforementioned playback control processing. Next, the decryption unit 203 checks whether or not the read encrypted content includes button data. Button data may be checked for by, for example, checking an unencrypted PAT (program association table) or PMT (program map table) included in the encrypted content, and judging whether a stream recorded as a private stream exits. The method used here is not limited to this method (S1002).

If button data is not included, the decryption unit 203 decrypts the read encrypted content packet by packet, and transmits the decrypted plaintext content to the display unit 207. The display unit 207 decodes the plaintext content, and displays video data on the screen and plays back audio data (S1003).

If button data is included, the decryption unit 203 obtains the "playback number on determination" included in the button data, after decrypting the button data. The decryption unit 203 controls the playback control unit 202 so as to obtain the file name of the playback content corresponding to each playback number on determination. To this end, the playback control unit 202 controls the read unit 201 so as to read the control medium information 211 from the medium 102, and obtains the playback content corresponding to the specified "playback number on determination". The decryption unit 203 inquires to the rights processing unit 208, via the key control unit 204, as to whether the playback content is playable. Note that playability judgment processing by the key control unit 204 and the rights processing unit 208 is described layer (S1004).

When the play ability has been obtained for the playback content corresponding to each button, the decryption unit 203 decrypts the read encrypted content packet by packet, and transmits the resulting plaintext to the display unit 207. The display unit 207 decodes the plaintext content, and displays video data on the screen and plays back audio data.

Furthermore, the display unit 207 displays buttons overlaid on the video data, in accordance with to the button data. Here, the display unit 207 changes the button display according to the playability of the playback content corresponding to the buttons. The display unit 207 displays normal buttons for corresponding playback content that is playable, and displays grayed out buttons for corresponding playback content that is not playable. Furthermore, the display unit 207 sets buttons whose corresponding playback content is not playable such that these buttons cannot be determined if they are selected (S1003).

(Content Key Obtaining Processing)

When a content key is required during content playback processing, the playback terminal 101 reads the key control information from the medium 102, and obtains the content key corresponding to the content.

Figure 11:
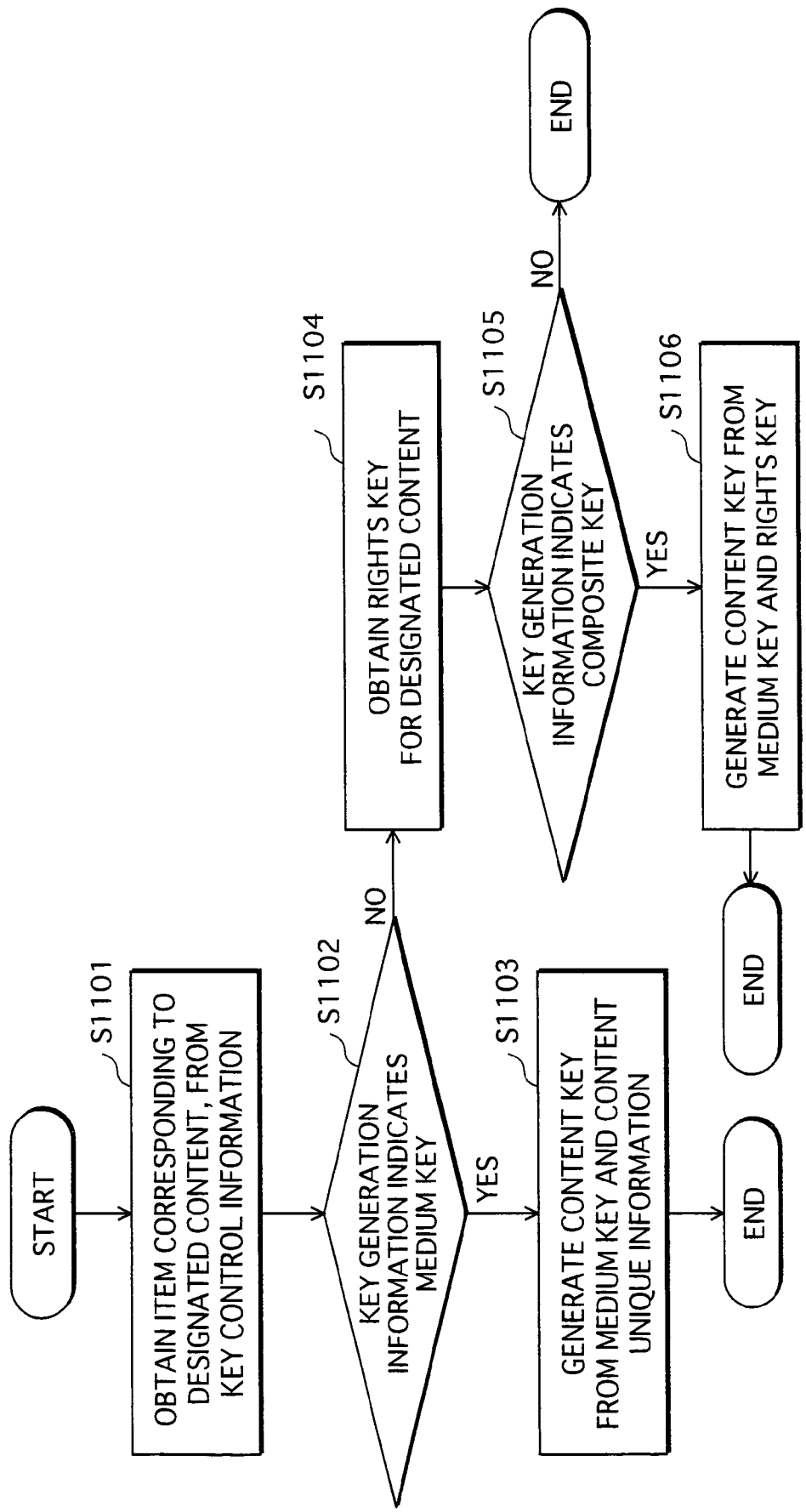
FIG. 11 is a flowchart showing procedures in content key obtaining processing.

FIG. 11 is a flowchart showing procedures in content key obtaining processing in the key control unit 204 and the rights processing unit 208.

The key control unit 204 controls the read unit 201 so as to obtain the key control information 213, and obtains the item corresponding to the content specified by the decryption unit 203 from the key control information 213 (S1101).

Next, the key control unit 204 obtains key generation information from the item specified at S1101. If the key generation information indicates "medium key", the key control unit 204 obtains the content unique information from the item specified at S1101, and generates a content key from the medium key obtained in the aforementioned medium key obtaining processing and the content unique information, using a one-way function. Note that the content key is not limited to being generated using a one-way function, but may be generated by any of various methods such as decrypting the content unique information with the medium key or simply concatenating the two and taking a hash of the concatenated information.

Furthermore, the key control unit 204 obtains playability information from the item specified at S1101. If the playability information indicates "not playable", the content is not played back. Note that in the present embodiment, since playback control is performed before instructing playback, by performing content playability judgment in advance, the only case in which content will be unusable here is when an irregularity such as an illegal attack occurs (S1102 to S1103).

If the key generation information obtained by the key control unit 204 does not indicate "medium key", the key control unit 204 controls the rights processing unit 208 so as to obtain the rights key corresponding to the content specified by the decryption unit 203. Note that rights key obtaining processing is described later (S1104).

If the key generation information obtained by the key control unit 204 indicates "rights key", the rights key obtained at S1104 is used as the content key. Note that even if the key generation information indicates "rights key", the rights key is not limited to being used as the content key as is. Possible methods for generating the content key here include one by which the content key is generated from the rights key and the content unique information using a one-way function. Furthermore, instead of generating the content key from the rights key in the key control unit, the content key may be generated in the rights processing unit. This is particularly effective in terms of security if the key control unit and the rights processing unit are implemented as separate tamper resistant modules (TRMs), because the rights key does not leave the key control unit (S1105).

If the key generation information obtained by the key control unit 204 indicates "composite key", the key control unit 204 generates the content key from the medium key obtained in the aforementioned medium key obtaining processing, using a one-way function. Note that the content key is not limited to being generated using a one-way function, but may be generated by any of various methods such as decrypting the content unique information with the medium key or simply concatenating the two and taking a hash of the concatenated information. Furthermore, the content unique information may also be used in generating the content key. This is particularly effective in terms of security if the key control unit and the rights processing unit are implemented as separate TRMs, because after generating information from the medium key and the content unique information, the key control unit notifies the rights processing unit of this information and the rights processing unit generates the content key from the notified information and the content key. This means that the medium key does not leave the rights processing unit and the rights key does not leave the key control unit (S1106).

(Rights Key Obtaining Processing)

When a rights key is required during the content key obtaining processing, the playback terminal 101 reads the rights information stored in the rights storage unit 209, and obtains the rights key corresponding to the content.

FIG. 12 shows an example of the data structure of the rights information. The rights information is composed of the following five pieces of information. Note that the rights information is not limited to being composed of the following five pieces of information, and various types of information are possible, particularly for the information about rights conditions such as the playback count and the playback expiration.

"Rights Method Information"

The rights method information specifies the method used for the rights information.

"Corresponding Playback Content"

The corresponding playback content is information for specifying content corresponding to the rights indicated in the item. The file name of the corresponding content is recorded here in the same manner as for the playback content recorded in the playback control information.

"Rights Key"

The rights key indicates the rights key corresponding to the rights indicated in the item.

"Playback Count"

The playback count indicates how many times the content in the item is playable according to the rights. The content is playable an infinite amount of times if there is no specification of the playback count.

"Playback Expiration"

The playback expiration indicates a time limit up to when the content in the item is playable according to the rights. The content is playable indefinitely if there is no specification of the playback expiration.

Figure 13:
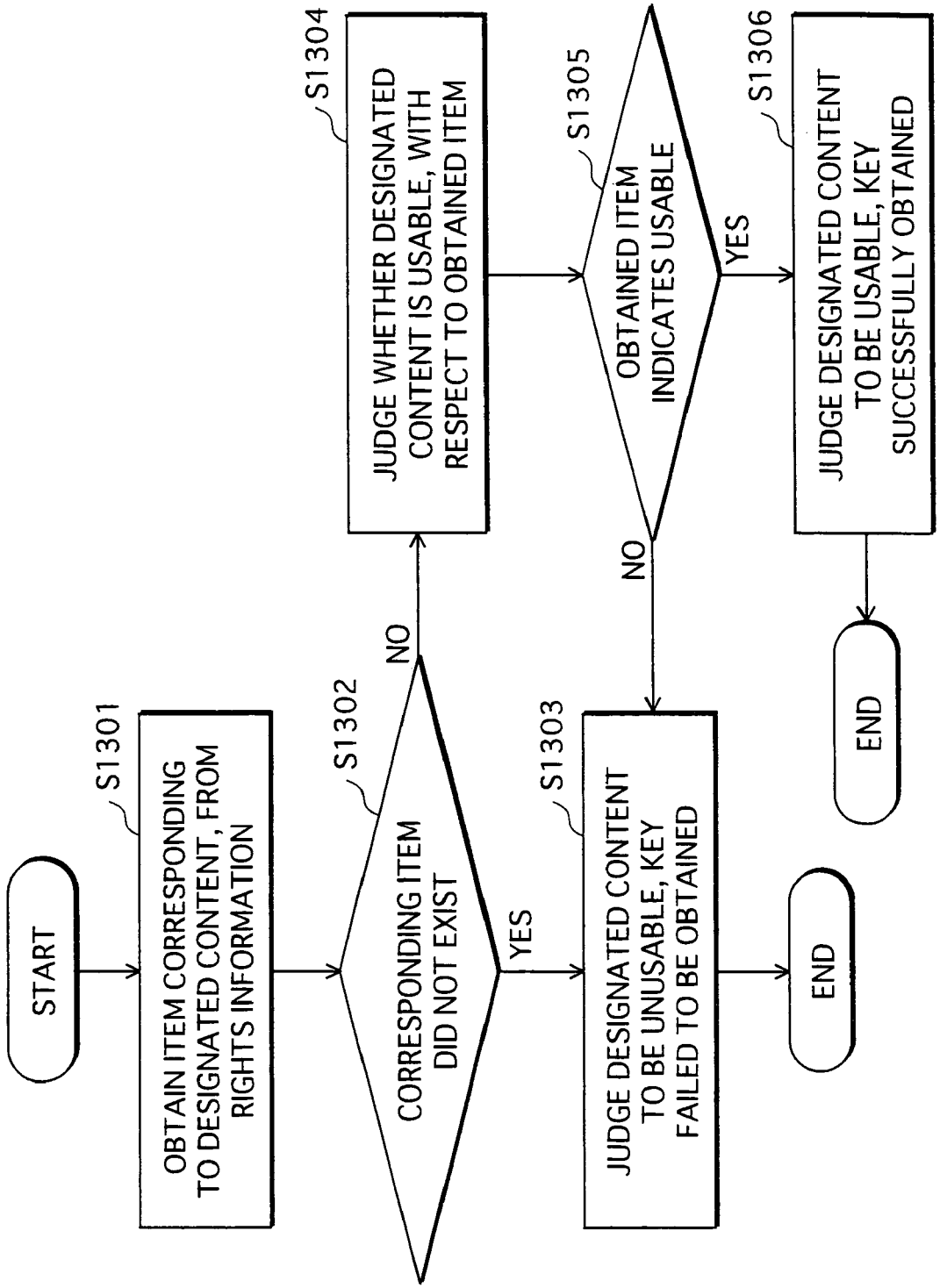
FIG. 13 is a flowchart showing procedures in rights key obtaining processing.

FIG. 13 is a flowchart showing procedures in rights key obtaining processing by the rights processing unit 208 and the rights storage unit 209.

The rights processing unit 208 controls the rights storage unit 209 so as to obtain rights information. The rights processing unit 208 obtains the item corresponding to the content specified by the key control unit 204 from the rights information. Note that items searched here are only the items in which the specified rights method information is the method listed in the corresponding rights method information included in the key control information. For example, if the corresponding rights method information in the key control information specifies a method A, even if "Making.mpg" is specified in the content, only the item in the second line in the rights information in FIG. 12 is searched, and the item in the third line is not searched (S1301).

When an item corresponding to the content specified at S1301 does not exist, the specified content is judged not to be usable, and the rights key fails to be obtained. Note that in the present embodiment, playback of content is instructed after having performed playback control by judging in advance whether or not content is playable, and therefore the only case in which content will not be usable here is when an irregularity such as an illegal attack occurs (S1302 to S1303).

When an item corresponding to the content specified at S1301 exists, it is further judged whether or not the content is usable, based on the playback count and the playback expiration. The content is judged to be usable if the playback count is not 0. Furthermore, the content is judged to be usable if the playback expiration has not passed. This judgment is made by comparing the playback expiration with a clock incorporated in the rights processing unit. If the content is judged to be usable according to both the playback count and the playback expiration, the content is judged to be usable. If a judgment of not usable is made according to even one of the playback count and the playback expiration, the content is judged to be unusable (S1304).

When the content is judged to be unusable, the rights key fails to be obtained, in the same way as when an item corresponding to the specified content does not exist at S1301 (S1305 to S1303).

When the content is judged to be usable, the rights processing unit 208 obtains the information specified as the rights key in the item corresponding to the content specified at S1301, and the processing is successful (S1306).

(Playability Judgment Processing)

When playability judgment is required during playback control processing, the playback terminal 101 reads key control information from the medium, and judges whether the content is playable.

Figure 14:
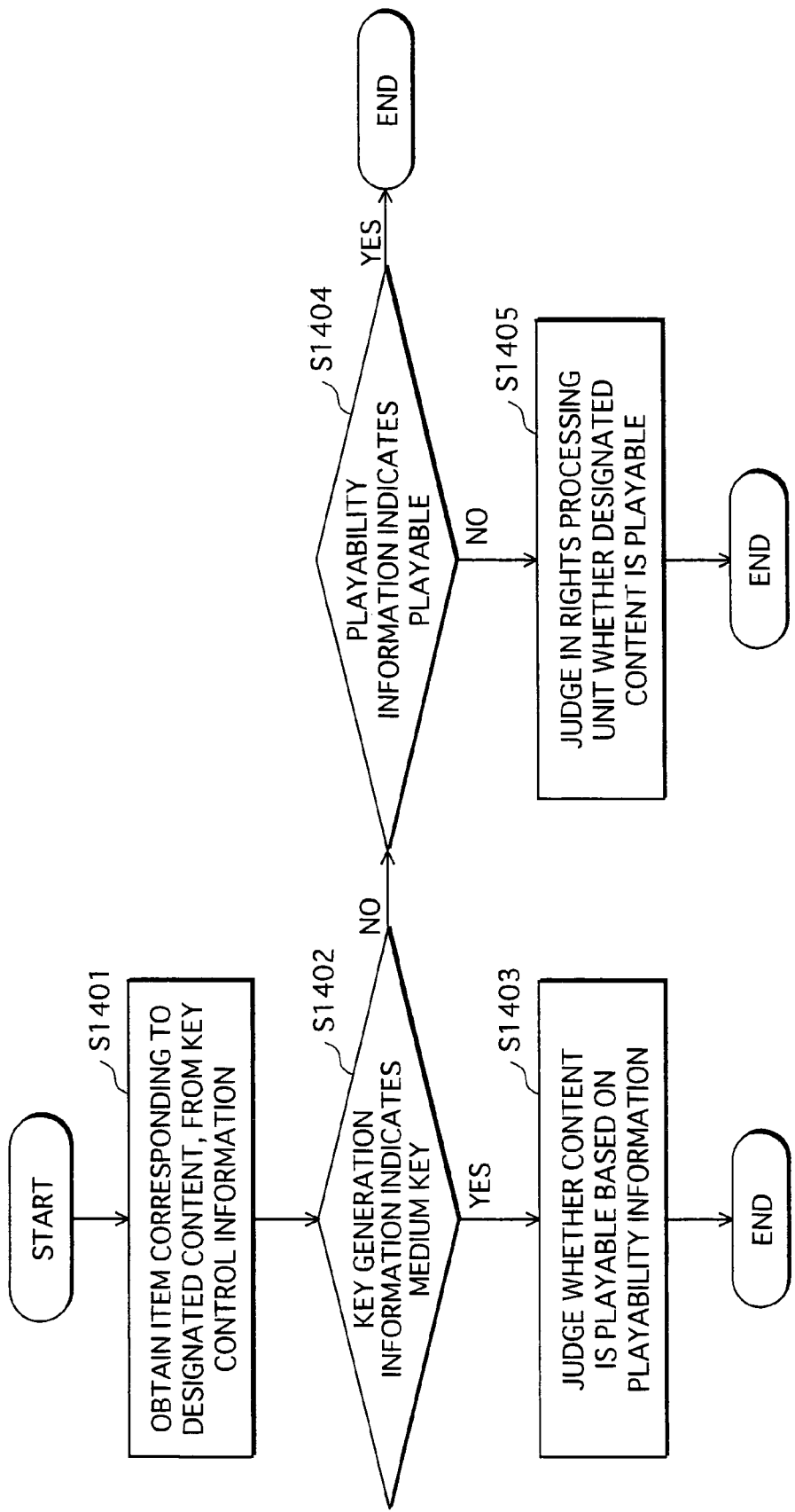
FIG. 14 is a flowchart showing procedures in content playability judgment processing.

FIG. 14 is a flowchart showing procedures in content playability judgment processing in the key control unit 204 and the rights processing unit 208.

The key control unit 204 controls the read unit 201 so as to obtain the key control information 213. The key control unit 204 obtains the item corresponding to the content designated by the decryption unit 203 from the key control information 213 (S1401).

Next, the key control unit 204 obtains the item specified at S1401 from the key generation information. If the key generation information indicates "medium key", the key control unit 204 obtains the play ability information from same item specified at S1101, and if the value set therein indicates "playable", judges that the specified content is playable. Conversely, if the set value indicates "not playable", the key control unit 204 judges that the specified content is not playable (S1402 to S1403).

If the key generation information obtained by the key control unit 204 does not indicate a medium key, the key control unit 204 obtains playability information from the same item specified at S1101. If the set value indicates "playable", the key control unit 204 judges that the specified content is playable. It should be noted that in actuality, even if the content is judged to be playable here, unless the rights processing unit obtains the rights key, the content key cannot be generated, and the content cannot be decrypted and played back. Therefore, in order to avoid confusion, it is effective to use a method in which playback is judged to be possible not simply because the playability information indicates "playable", but in which, after checking whether a rights key exists, it is judged whether or not content is playable (S1404).

When the playability information indicates "not playable", the rights judgment unit 208 judges that the specified content is playable. Note that rights judgment processing is described later (S1405).

(Rights Judgment Processing)

When rights judgment processing is required during playability judgment processing, the playback terminal 101 reads the rights information stored in the rights storage unit 209, and judges whether or not the content is playable.

Figure 15:
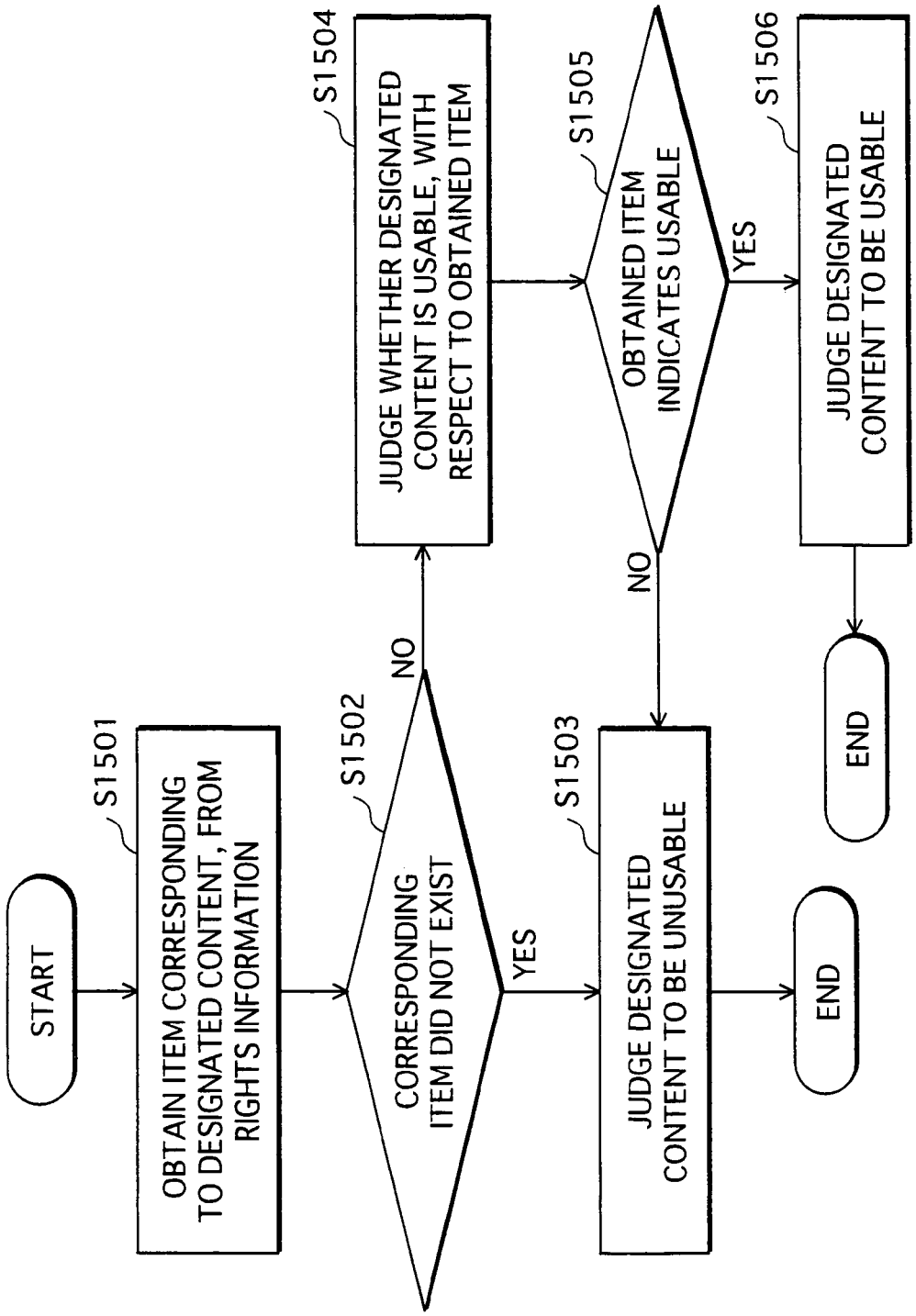
FIG. 15 is a flowchart showing procedures in rights judgment processing.

FIG. 15 is a flowchart showing procedures in rights judgment processing in the rights processing unit 208 and the rights storage unit 209.

The rights processing unit 208 controls the rights storage unit 209 so as to obtain rights information. The rights processing unit 208 obtains the item corresponding to the content specified by the key control unit 204 from the rights information. Note that items searched here are only the items in which the specified rights method information is the method listed in the corresponding rights method information included in the key control information. For example, if the corresponding rights method information in the key control information specifies a method A, even if "Making.mpg" is specified in the content, only the item in the second line in the rights information in FIG. 13 is searched, and the item in the third line is not searched (S1501).

When an item corresponding to the content specified at S1501 does not exist, the rights processing unit 208 judges the specified content not to be usable (S1502 to S1503).

When an item corresponding to the content specified at S1501 exists, the rights processing unit 208 further judges whether or not the content is usable, based on the playback count and the playback expiration. The content is judged to be usable if the playback count is not 0. Furthermore, the content is judged to be usable if the playback expiration has not passed. This judgment is made by comparing the playback expiration with the clock incorporated in the rights processing unit. If the content is usable according to both the playback count and the playback expiration, the content is judged to be usable. If a judgment of not usable is made according to even one of the playback count and the playback expiration, the content is judged to be not usable (S1504 to S1506).

(Rights Obtaining Processing)

Finally, the following describes rights obtaining processing by the rights obtaining unit 210. When obtaining rights, the rights obtaining unit 210 establishes an encrypted communication path with the rights transmission unit 301 of the license server 104, using an SAC (Secure Authentication Channel). The rights obtaining unit 210 then request the rights transmission unit 301 to transmit rights. Note that rights generation or non-control using the transmission-side control unit 302 and the rights generation control unit 303 in the license server are unrelated to the present patent, and therefore descriptions thereof are omitted.

Note that the playback control according to usability of content based on a license is not limited to the two examples given in the present embodiment, specifically, controlling the playback path according to the playback control information and whether or not buttons are displayed. For example, if playback control is applied to angle switching in a DVD, it is possible to prohibit switching to a particular angle that is not usable. Similarly, if playback control is applied to audio or subtitle streams, it is possible to prohibit switching to a particular audio or subtitle stream that is not usable.

Furthermore, although the present embodiment has a structure in which the key control information is recorded without being encrypted, it is preferable to protect the key control information by encryption or the like, considering the possibility of illegal playback or illegal copying by tampering with the playability information or the copy permission information in the key control information. In such a case, it is effective to encrypt the key control information with the medium key.

Note that while the present embodiment relates to playback of content, the same method may be applied in relation to copying of content.

Furthermore, although in the example in the present embodiment playback control is performed in the same way when content is not usable, regardless of the reason, this is not limited to being the case. For example, playback control may be performed differently in the case of there not being a license and in the case of the expiration having been passed. Furthermore, the rights processing unit, the rights storage unit and the rights obtaining unit may be implemented as a device such as a card, and the inquiry to the rights processing unit may be considered to have failed when the device is removed from the playback terminal. With such a case in mind, different playback processing may be performed if the rights processing unit is not found.

Note that although the structure of the present embodiment is one in which the content key obtaining processing and the rights key obtaining processing treat only playability, the structure is not limited to this. For example, in addition to information relating to playability, information relating to playback quality of video streams and audio streams may be added to the key control information and the rights information. In such a case, the information relating to playback quality may be additionally treated in content key obtaining processing and rights key obtaining processing. Generally, it is desirable to overwrite the playback quality information included in the key control information with playback quality information described in the rights information. Playback quality information obtained in this way is notified to the display unit by the decryption unit, and the display unit plays back only with the specified quality. This makes it possible to, for example, forcedly instruct so that HD picture quality content is down-converted to SD picture quality or QCIF picture quality.

Furthermore, while the rights method information is included in the rights information itself in the present embodiment, there is a danger that the rights method information will be tampered with if in this state. This is because cases in which individual enterprises use respective rights methods are common, and the danger of a malicious enterprise working illegally with respect to another enterprise cannot be excluded. In order to avoid this kind of problem, a method may be used in which a signature is provided for the rights information, and the method information is included in a certificate of the provider of the signature. Furthermore, as another method, when mutual authentication is performed between the key control unit and the rights processing unit using an SAC (Secure Authentication Channel), the key control unit extracts the method of the opposing rights processing unit from the certificate received during mutual authentication, and checks whether the extracted method matches the corresponding rights method information. Note that if mutual authentication is performed, it is common to use a method where the medium and the rights storage unit each store a CRL (Certificate Revocation List), and illegal modules are thereby excluded.

Note that in the present embodiment content is unconditionally not playable when "medium key" is specified in the key control information and "not playable" is specified in the playability information, but it not limited to being so. Even in this case, it is possible to inquire once again to the rights processing unit about usability.

Furthermore, although the key control information is recorded on the medium separately to the encrypted content in the present embodiment, it is not limited to being so. For example, the key control information may be multiplexed with the encrypted content. In this case, information relating to playback content is unnecessary in the key control information because the connection between the key control information and the content is clear. Furthermore, it is also possible for the key selection information to be recorded on a separate medium, or to be obtained via a network. This is particularly effective in a case in which the content is not only recorded on one packaged medium, but instead includes extra content which is obtained from another network and recorded in an HDD.

Note that in the present embodiment a structure is described in which file names of corresponding playback content are recorded in the rights information, but the structure is not limited to this. For example, an identifier of each rights may be recorded in the rights information, and by storing corresponding identifiers in the key control information also, the corresponding rights may be searched for with the identifier.

Furthermore, the rights are obtained from the license server in the present embodiment, but are not limited to this. For example, the rights may be stored on the medium, and read therefrom.

INDUSTRIAL APPLICABILITY

The encrypted content playback apparatus and the playback method of the present invention, and a recording medium on which is recorded data used therein are suitable for content playback with media on which both content subject to conventional copy prevention and content to which DRM is applied exist, and are effective in fields such as packaged media and content distribution.

What is claimed is:

1. A playback terminal for playing back content, the playback terminal comprising:
   a holding unit operable to hold device unique information pre-stored in the playback terminal, the device unique information being unique to the playback terminal;
   a content read unit operable to read encrypted content from a portable medium, the encrypted content being generated by encrypting content using at least medium information including an encrypted medium key, generated by encrypting a medium key with the device unique information, pre-recorded on the portable medium;
   a decryption method judgment unit operable to judge whether or not rights information including usage rights for the encrypted content managed by an external license server is required for decrypting the encrypted content;

a medium information read unit operable to read the medium information pre-recorded on the portable medium;

a communication unit operable to acquire the rights information managed by the external license server when it is judged that the rights information is required, the rights information managed by the external license server being a part of information which is required for the decryption of the encrypted content;

a medium content key calculation unit operable to decrypt the encrypted medium key, with use of the device unique information, so as to obtain the medium key, and to cryptographically calculate a medium content key using the medium key;

a license content key calculation unit operable to cryptographically calculate a license content key using the medium content key and the rights information acquired from the external license server; and a decryption unit operable to (a) decrypt the encrypted content using the medium content key, when it is judged that the rights information is not required, and (b) decrypt the encrypted content using the license content key, when it is judged that the rights information is required, wherein the decryption unit includes:

a content key obtaining sub-unit operable to, when it is judged that the rights information is not required, obtain the medium content key used in decrypting of the encrypted content; and a content decryption sub-unit operable to, when it is judged that the rights information is not required, decrypt the encrypted content using the medium content key, the medium content key calculation unit, when it is judged that the rights information is not required, obtains the medium key by decrypting the encrypted medium key using the device unique information, the encrypted medium key recorded on the portable medium is generated by encrypting the medium key using device information of valid playback terminals, and the content key obtaining sub-unit fails to obtain the medium key by decrypting the encrypted medium key, when the device unique information of the playback terminal itself is not included in the device information of the valid playback terminals.

2. The playback terminal of claim 1, wherein
the content key obtaining sub-unit, when it is judged that the rights information is required, obtains the license content key used in decrypting of the encrypted content, and
the content decryption sub-unit, when it is judged that the rights information is required, decrypts the encrypted content using the license content key.

3. The playback terminal of claim 2, wherein
the rights information includes a rights key,
the license content key calculation unit cryptographically calculates the license content key using the rights key of the rights information, and
the content key obtaining sub-unit, when it is judged that the rights information is required, obtains the license content key using the rights key.

4. The playback terminal of claim 2, wherein
the portable medium further has recorded thereon key obtaining information indicating whether or not the rights information is required for obtaining a key used for decrypting the encrypted content, and
the playback terminal further comprises:
a key obtaining information read unit operable to read the key obtaining information from the portable medium, wherein
the decryption method judgment unit performs the judgment of whether or not the rights information is required for decrypting the encrypted content, based on the key obtaining information.

5. The playback terminal of claim 1, wherein
the decryption unit, when it is judged that the rights information is required, decrypts the encrypted content only when the communication unit has already acquired the rights information and the rights information indicates that usage of the content is permitted.

6. The playback terminal of claim 1, wherein
the portable medium further has recorded thereon information indicating whether or not the rights information is required for decrypting of the encrypted content, and
the playback terminal further comprises:
an information read unit operable to read the information from the portable medium, wherein
the decryption method judgment unit performs the judgment of whether or not the rights information is required for decrypting the encrypted content, based on the information.

7. The playback terminal of claim 1, wherein
the rights information includes information showing permission to play back the content.

8. The playback terminal of claim 7, wherein
the portable medium further has recorded thereon information indicating whether or not the rights information is required for decrypting the encrypted content, and
the decryption method judgment unit judges whether or not the rights information is required for decrypting the encrypted content based on the information recorded on the portable medium.

9. A content playback method used in a playback terminal for playing back content, the playback terminal having a holding unit that holds device unique information pre-stored in the playback terminal, the device unique information being unique to the playback terminal, the content playback method comprising:

reading encrypted content from a portable medium, the encrypted content being generated by encrypting content using at least medium information including an encrypted medium key, generated by encrypting a medium key with the device unique information, pre-recorded on the portable medium;

judging whether or not rights information including usage rights for the encrypted content managed by an external license server is required for decrypting the encrypted content;

reading the medium information pre-recorded on the portable medium;

acquiring the rights information managed by the external license server when it is judged that the rights information is required, the rights information managed by the external license server being a part of information which is required for the decryption of the encrypted content;

decrypting the encrypted medium key, with use of the device unique information, so as to obtain the medium key, and cryptographically calculating a medium content key using the medium key;

cryptographically calculating a license content key using the medium content key and the rights information acquired from the external license server; and a decryption step of (a) decrypting the encrypted content using the medium content key, when it is judged that the rights information is not required, and (b) decrypting the encrypted content using the license content key, when it is judged that the rights information is required, wherein the decrypting of the encrypted content using the medium content key, when it is judged that the rights information is not required, comprises obtaining the medium content key used in decrypting of the encrypted content and decrypting the encrypted content using the medium content key, the cryptographically calculating of the medium content key, when it is judged that the rights information is not required, comprises obtaining the medium key by decrypting the encrypted medium key using the device unique information, the encrypted medium key recorded on the portable medium is generated by encrypting the medium key using device information of valid playback terminals, and the cryptographically calculating of the medium content key fails to obtain the medium key, when the device unique information of the playback terminal itself is not included in the device information of the valid playback terminals.

10. The content playback method claim 9, wherein the decryption step further includes obtaining, when it is judged that the rights information is required, the license content key used in decrypting of the encrypted content, and decrypting, when it is judged that the rights information is required, the encrypted content using the license content key.

11. The content playback method of claim 10, wherein the rights information includes a rights key, the cryptographically calculating of the license content key comprises cryptographically calculating the license content key using the rights key of the rights information, and the obtaining of the license content key comprises, when it is judged that the rights information is required, obtaining the license content key using the rights key.

12. The content playback method of claim 10, wherein the portable medium further has recorded thereon key obtaining information indicating whether or not the rights information is required for obtaining a key used for decrypting the encrypted content, and the content playback method further comprises:

reading the key obtaining information from the portable medium, wherein the judging comprises judging whether or not the rights information is required for decrypting the encrypted content, based on the key obtaining information.

13. The content playback method of claim 9, wherein the decrypting of the encrypted content includes, when it is judged that the rights information is required, decrypting the encrypted content only when the acquiring has already acquired the rights information and the rights information indicates that usage of the content is permitted.

14. The content playback method of claim 9, wherein the portable medium further has recorded thereon information indicating whether or not the rights information is required for decrypting of the encrypted content, and the content playback method further comprises:

reading the information from the portable medium, wherein the judging comprises judging whether or not the rights information is required for decrypting the encrypted content, based on the information.

15. The content playback method of claim 9, wherein the rights information includes information showing permission to play back the content.

16. The content playback method of claim 15, wherein the portable medium further has recorded thereon information indicating whether or not the rights information is required for decrypting the encrypted content, and the judging comprises judging whether or not the rights information is required for decrypting the encrypted content based on the information recorded on the portable medium.

* * * * *